(12) United States Patent
Kirsche

(10) Patent No.: US 10,978,106 B2
(45) Date of Patent: Apr. 13, 2021

(54) MEDIA RECORDING ELEMENT

(71) Applicant: TIVO CORPORATION, San Jose, CA (US)

(72) Inventor: Richard Kirsche, Ringoes, NJ (US)

(73) Assignee: TIVO CORPORATION, San Jose, CA (US)

( * ) Notice: Subject to any disclaimer, the term of this patent is extended or adjusted under 35 U.S.C. 154(b) by 0 days.

(21) Appl. No.: 16/102,279

(22) Filed: Aug. 13, 2018

(65) Prior Publication Data

US 2019/0214051 A1 Jul. 11, 2019

Related U.S. Application Data

(63) Continuation of application No. 14/493,947, filed on Sep. 23, 2014, now Pat. No. 10,074,395, which is a continuation of application No. 11/561,541, filed on Nov. 20, 2006, now Pat. No. 8,897,622.

(51) Int. Cl.
| | |
|---|---|
| *G11B 19/02* | (2006.01) |
| *H04N 5/85* | (2006.01) |
| *H04N 9/804* | (2006.01) |
| *G11B 19/04* | (2006.01) |

(52) U.S. Cl.
CPC ............ *G11B 19/02* (2013.01); *G11B 19/044* (2013.01); *H04N 5/85* (2013.01); *H04N 9/8042* (2013.01)

(58) Field of Classification Search
CPC ........ G11B 19/02; G11B 19/044; H04N 5/85; H04N 9/8042
See application file for complete search history.

(56) References Cited

U.S. PATENT DOCUMENTS

| | | |
|---|---|---|
| 4,688,168 A | 8/1987 | Gudaitis et al. |
| 5,621,473 A | 4/1997 | Hill |
| 6,226,447 B1 | 5/2001 | Sasaki et al. |
| 6,282,643 B1 | 8/2001 | Cromer et al. |
| 7,468,682 B2 | 12/2008 | Altare |
| 7,778,520 B1 | 8/2010 | Virden et al. |
| 2001/0035903 A1 | 11/2001 | Trane |
| 2002/0092021 A1 | 7/2002 | Yap et al. |
| 2002/0106185 A1 | 8/2002 | Fujii et al. |
| 2002/0107909 A1 | 8/2002 | Eyer et al. |
| 2002/0164150 A1 | 11/2002 | Kusumoto et al. |
| 2002/0188956 A1 | 12/2002 | Ficco et al. |
| 2004/0213103 A1 | 10/2004 | Wu et al. |
| 2004/0215593 A1* | 10/2004 | Sharangpani ..... G06F 16/90344 |
| 2004/0258396 A1 | 12/2004 | Nakamura et al. |
| 2005/0117892 A1 | 6/2005 | Nishida |
| 2005/0188409 A1 | 8/2005 | Daniels |

(Continued)

FOREIGN PATENT DOCUMENTS

JP 2002142177 A 5/2002

OTHER PUBLICATIONS

Mar. 31, 2017—(CA) Office Action—App. 2,611,063.
Feb. 26, 2018—Canadian Office Action—CA 2,611,063.

*Primary Examiner* — Mishawn N. Hunter
(74) *Attorney, Agent, or Firm* — Haley Guiliano LLP

(57) ABSTRACT

A media recording element having capabilities to facilitate recording media for subsequent playback. The recording element further including features associated with limited operations of a hard drive of other similarly mechanical memory under certain operating conditions so as to limit power consumption and/or memory degradation.

21 Claims, 1 Drawing Sheet

(56) References Cited

U.S. PATENT DOCUMENTS

| | | |
|---|---|---|
| 2005/0265691 A1 | 12/2005 | Sato et al. |
| 2005/0278522 A1 | 12/2005 | Fortin et al. |
| 2006/0051060 A1 | 3/2006 | Dorovanessian et al. |
| 2006/0064716 A1 | 3/2006 | Sull et al. |
| 2006/0085493 A1* | 4/2006 | Kim .................... G06F 3/0643 |
| 2006/0110127 A1 | 5/2006 | Iggulden |
| 2006/0209444 A1 | 9/2006 | Song et al. |
| 2006/0215988 A1 | 9/2006 | Tol et al. |
| 2006/0222316 A1 | 10/2006 | Weng et al. |
| 2006/0271975 A1 | 11/2006 | Sun et al. |
| 2007/0006273 A1 | 1/2007 | Rodriguez et al. |
| 2007/0009236 A1 | 1/2007 | Kovacevic |
| 2007/0216780 A1* | 9/2007 | Umezaki ............ H04N 21/8456 348/231.6 |
| 2007/0226766 A1 | 9/2007 | Poslinski et al. |
| 2008/0118227 A1 | 5/2008 | Barton |
| 2009/0136215 A1 | 5/2009 | Barton et al. |

* cited by examiner

MEDIA RECORDING ELEMENT

CROSS-REFERENCE TO RELATED APPLICATIONS

This Application is a Continuation of application Ser. No. 14/493,947 filed on Sep. 23, 2014, which is a Continuation of application Ser. No. 11/561,541 filed on Nov. 20, 2006. The entire contents of these applications are incorporated herein by reference in their entirety.

BACKGROUND OF THE INVENTION

1. Field of the Invention

The present invention relates to media recording elements of the type having a hard drive or other mechanically operational element for storing media for subsequent playback to a media output device, such as but not limited to digital video recorders (DVRs).

2. Background Art

The use of various media recording element is becoming more and more prevalent. The media recording elements typically include a hard drive or other mechanically operational element having a rotating disc drive, head, reader, etc. for recording incoming content the subsequent playback. The content may be stored on hard drive for various lengths of time. One length of time may correspond with buffering operations.

Buffering operations generally correspond with a brief period of time where incoming content is written to and immediately thereafter read for output to a media output device. The buffering allows the content to be viewed in a live setting while also allowing a viewer to instigate so called DVR related operations on the buffered content, i.e. operations associated with but not limited to pausing, rewinding, recording, and slow playing the content.

The hard drive is constantly operational during the buffering phase in order to support the DVR related operations. This can be problematic in so far as the relatively constant operation of the hard drive may degrade its performance and lifetime and/or in so far as the constant operation negatively influences energy conservation.

BRIEF DESCRIPTION OF THE DRAWINGS

The present invention is pointed out with particularity in the appended claims. However, other features of the present invention will become more apparent and the present invention will be best understood by referring to the following detailed description in conjunction with the accompany drawings in which:

DETAILED DESCRIPTION OF THE PREFERRED EMBODIMENT(S)

Figure 1:
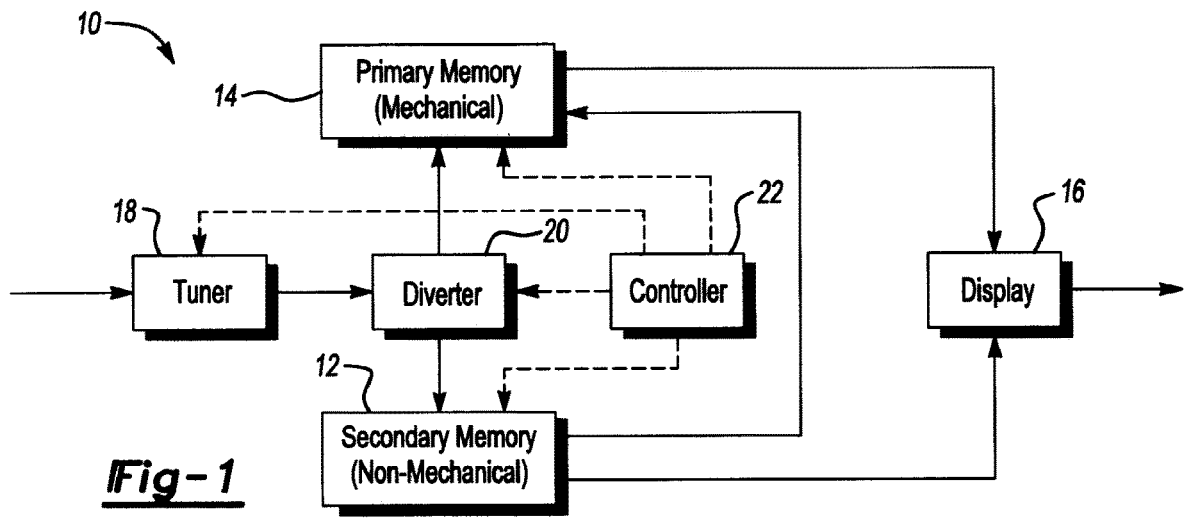
FIG. 1 schematically illustrates a media system in accordance with one non-limiting aspect of the present invention.

FIG. 1 schematically illustrates a media system 10 in accordance with one non-limiting aspect of the present invention. The system 10 generally relates to any environment where a secondary memory 12 may be used for buffering incoming content so as to alleviate a primary memory 14 from having to buffer or otherwise sustain some or all of its normal activities while the incoming content is being processed by the system 10 for output to a viewer or other entity associated with the an output device 16.

The ability of the present invention to buffer the incoming content with the secondary memory 12 instead of the primary memory 14 allows the present invention to save energy consumption of and/or usage related degradation to the primary memory 14. This may help reduce overall system/operating cost and increase the useful life of the media storage system.

The primary memory 14 may include hard drives or other similar mechanically operational memories having moving elements to facilitate recording and playing back content, such as but not limited to memories having rotating discs and one or more moving heads (read/write). The secondary memory 12 may include any non-mechanically operational memory, such as but not limited to a static, flash, solid-state and/or other memory that does not include similar mechanically moving elements. Performing operations with the secondary memory 12 instead of the primary memory 14, at least when it may be advantageous to do so, alleviates operations of the mechanical elements of the primary memory 14, and thereby, lengthens its useful life and reduces system energy consumption.

The system 10 is generally described with respect to a digital video recorder (DVR) environment where the DVR outputs signals for playback to the media output device and/or the media device is integrated with the DVR. This is done for exemplary purposes only and without intending to limit the scope and contemplation of the present invention. The present invention, however, may be applicable to any number of other environments, including environments where the hard drive 14 and/or secondary memory 12 are integrated with and/or more remotely located from the media output device, including but not limited to personal media devices, mobile (IP/cellular) phones, media terminal adapters (MTAs), outlet digital adapters (ODAs), computers, etc.

Similarly, the present invention is predominately described with respect to facilitating short and/or long term recording and playback of cable television media. This is done for exemplary purposes only and without intending to limit the scope and contemplation of the present invention, as the present invention fully contemplates its use with any type of recordable media and not just media content associated with cable television environments, including but not limited to audio, video, images, data, etc.

The system 10 may include a tuner 18 for receiving wireline and/or wireless signals having the media content. The tuner 18 may encompass any device and/or combination of device, elements, and/or features associated with receiving electronic media content. The tuner 18 may be a RF and/or IP tuner/demultiplexer and may include any number of capabilities for locating and separately processing specific portions of the incoming signals.

For example, the tuner 18 may be a tuner commonly associated with receiving RF and/or IP based media content wherein multiple sets of media content or streams of media content may be simultaneously received, such as but not limited to receiving content associated with different channels or bandwidths carried of a single cable line. The timer 18 may be instructed and/or otherwise configured to locate desired content from the incoming content stream for further processing in accordance with present invention.

Optionally, the system 10 may be part of and/or operate in conjunction with a settop box (STB). The STB may include the tuner and include its own tuner for bypassing or facilitating operations of the tuner shown in the system. The STB may include conditional access features (CAS), authorized service domain (ASD), and/or other elements associated with descrambling, decrypting or otherwise limiting access and/or proliferation of the incoming content in accordance with the present invention. These and other features may be associated the incoming content and optionally carried with the content throughout the processing of the present invention so as to insure their continued operation.

The system 10 may include a diverter 20 for controlling and/or facilitating delivery of one or more (decrypted, descrambled, decoded, etc.) content streams associated with incoming content for processing in accordance with the present invention. The tuning of multiple content streams may be accomplished with the single illustrated tuner and/or with the cooperation of one or more additional tuners, i.e. to provide dual or multi-tuner operations.

The diverter 20 may encompass any device and/or combination of devices, elements, and/or features associated with diverting the electronic media content. The diverter 20 is shown as a standalone feature but it or the operations associated with it may be similarly integrated into the tuner 18, other element in the system, and/or some other non-illustrated or described element having the sufficient capabilities to divert or otherwise controllably facilitate the transmission of the desired content between the primary and secondary memory.

The system 10 may include a controller 22 to facilitate controlling the tuner, diverter, primary and secondary memories. The controller 22 may be a standalone controller, a software application, and/or other logically functioning element or feature having capabilities to execute the controls necessitated for the operations associated with the present invention. The controller may be configured to execute the controls of the present invention prior to deployment, such as but not limited to at the time or manufacturing the DVR, and/or otherwise instructed after deployment, such as but not limited to through code download or other operations, which may optionally be facilitated by a media provider associated with supporting the operations of the same.

As noted above, the primary memory 14 generally relates to a memory having mechanically operational and/or moving elements, such as but not limited to those commonly associate with a hard drive. The moving elements may be, but are not limited to, one or more rotating memory recoding discs and one or more corresponding sets of read/write elements. For example, in a single-tuning environment, i.e., where only a single content stream is recorded, the primary memory 14 may include a single rotating disc with a single set of read/write elements configured to facilitate reading and writing the content to and from the rotating disc. In a multi-tuner environment, i.e. where more than one content stream is recorded at the same time the, primary memory 14 may include one or more additional rotating disc for the additional content streams with correspondingly additional read/write elements and/or multiple read/write may be used in place of multiple discs so as to facilitate reading and writing each content stream.

The secondary memory 12 generally relates to a memory having none or limited mechanically moving elements, such as static and/or flash memories, such that the secondary memory 12 may be characterized as a non-hard disc drive memory. The secondary memory 12 may be partitionable in so far as portions of the memory may be dedicated or otherwise allocated to storing content for different periods of time and/or for different content streams.

The controller 22 may control memory allocation and other features and operations associated with storing and recovering content stored on the primary and secondary memories 12-14. This may include individually and separately controlling operations associated with the mechanical elements of the primary memory 14, i.e., the disc(s) and set(s) of read/write elements, including separately controlling each read/write element within a set, i.e., so as to permit one of the elements to be active the and the other to be inactive. This may also include separately allocated portions of the secondary memory 12 to each of the content streams and varying the allocation thereof as a function of operations of the primary memory 14.

The controller 22 may be configured to support and/or otherwise devised to support so called DVR related controls. The DVR related controls may relate to storing and playing content in response to DVR related events or other event generally associated with long term storage related controls that the short term memory of the secondary memory 12 may be unable to support. This may include but is not limited to recording, pausing, rewinding, slow playing, and any number of other operations associated with recording and playing back content, including but not limited to providing user interfaces, menus, and other features associated with supporting the same. The controller may be in communication with a remote control (not shown), STB, or other feature in order to determine occurrence of a DVR related event.

Figure 2:
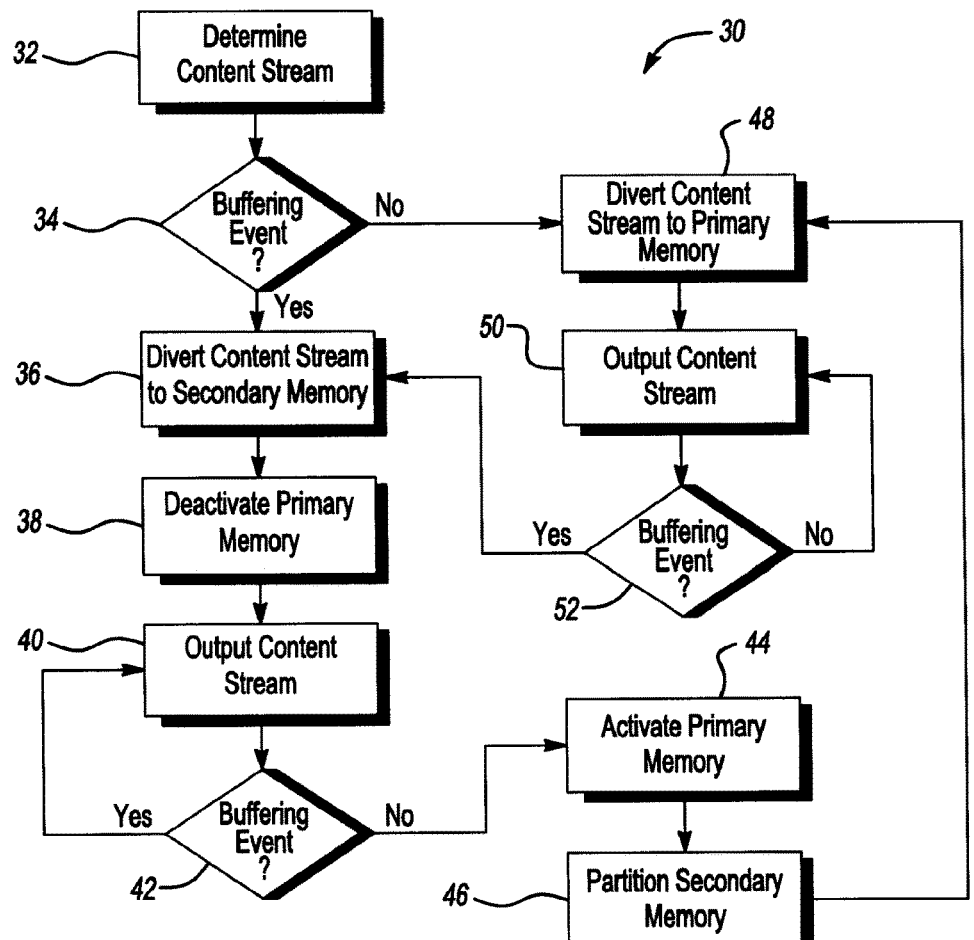
FIG. 2 illustrates a flowchart of a method of controlling the media system in accordance with one non-limiting aspect of the present invention.

FIG. 2 illustrates a flowchart 30 of a method of controlling the media system in accordance with one non-limiting aspect of the present invention. The method is predominately described with respect to the system described above but the present invention is not intended to be so limited. The method, as noted above with respect to the system 10, may be used with and/or adapted for use with any system and in any number of environments. The method may be implemented in the controller 22 and used to control the features described above and/or implemented with some other executing feature having capabilities to process content in accordance with the present invention.

Block 32 relates to determining one or more content streams having content desired for processing in accordance with the present invention. This may include determining one or more content streams such that multiple portions of the secondary memory 12 and/or the primary memory 14 may be simultaneously active. As noted above, the term content stream is intended to include a form of electronic content transmission. The content stream determination may be made based on user inputs and/or other selections processes associated with identifying content, channels carrying the content, and other means associated with facilitating content retrieval.

Block 32 may further include associating the incoming content stream with portions of the primary memory 14 and the secondary memory 12. This may include the controller 22 associating a disc and set of write/read elements of the primary memory 14 to each content stream and partitioning the secondary memory 12 with respect to the different content streams. Discs and/or operations of the write/read elements of the primary memory 14 may be required in order to support controls associated with longer term storage that cannot be supported with the secondary memory 12. The allocation of the primary and secondary memories 12-14 may be necessary in order to simultaneously support processing multiple content streams.

Block 34 relates to determining occurrence of a buffering event. The buffering event may correspond with any event associated with conditions suitable for buffering content with the secondary memory 12 instead of the primary memory 14. DVR events, such as pausing, rewinding, recording, slow playing, fast playing, etc. are generally not considered as buffering events as primary memory 14 operations are generally required to support the operations, with the exception of recording or other functions which may include limited primary memory operations.

The secondary memory 12 may be a simple in/out memory in the sense that content is temporarily written to and read from the secondary memory 12 without the capabilities to support permanent or long term recording operations, rewind, long term pausing, and other events that required longer term memory storage, i.e., storage beyond that associated with a portion of the secondary memory 12 allocated by the controller 22 to the corresponding content stream.

For example, a portion of the secondary memory 12 may be allocated to each content stream determined in Block 32 such that the secondary memory 12 is only able to store content for the each content stream until the corresponding partition becomes full. Once the partition is full, the content is automatically outputted to the output device and/or the primary memory 14 so as to make room for the rest of the incoming content stream such that the secondary memory may be considered as an in/out or first-in-first-out memory in the sense that content is continuously moved in and out as long as content is being received for the corresponding partition.

As such, the buffering events generally correspond with any event or set of events having conditions suitable for use in at least temporarily storing the content in a first-in-first-out fashion or similar fashion with the secondary memory 12, i.e., conditions where limited in/out memory is acceptable. The present invention, therefore, contemplates any number of buffering events and is not intended to be limited to any particular event or set of events, including performing some limited DVR related controls with the secondary memory 12 if the secondary memory 12 includes sufficient memory or can be partitioned to include sufficient memory to facilitate such control, such as but not limited to pausing (if space available on secondary memory to support period of time associated with pausing), rewind (if content still stored on secondary memory), etc.

One particular buffering event of interest, however, relates to watching television or other incoming content streams in a live or relatively live setting such that the incoming content is buffered with the secondary memory 12 instead of the primary memory 14 until memory recording beyond the capabilities described above with respect to the secondary memory 12 is needed. Another buffering event may relate to watching television and simultaneously recording the program being watched or another program showing on another channel, in which case the content may be diverted to the secondary memory 12 to support the live watching and simultaneously diverted to the primary memory 14 for permanent storage (as noted below, the read element of the primary memory 14 may be inactive in this condition so as to limit the number of active elements as the reading function is being performed by way of the secondary memory).

Block 36 relates to diverting one or more of the determined incoming content streams to the secondary memory 12 for storage and immediate output. This may include the controller 22 partitioning the secondary memory 12 based upon the number of content streams and/or reallocating the secondary memory 12 if one or more content streams are added or lost, i.e. if content streams are added then less memory may be available and if content streams are lost or not desired then more memory may be allocated. As such, Block 36 may relate to dynamically allocating the secondary memory 12 as a function of current and/or anticipated operating conditions.

Block 38 relates to deactivating one or more aspects of the primary memory 14 as a function of the content being buffered with the secondary memory 12. For non-recording events, this may include completely deactivating the primary memory 14 (or the portion of the primary memory 14 associated with supporting that content stream) such that the portion of the primary memory 14 is in a quiescent state, and for events such as recording and simultaneous watching, the corresponding read element may be deactivated. The deactivation of one or more aspect of the primary memory 14 allows to the present invention to limit activity and energy consumption of the primary memory.

Block 40 relates to outputting the content stream buffered with the secondary memory 12 to the media output device for viewing. This may optionally include outputting a single content stream from a single partition of the secondary memory and/or multiple content stream from multiple partitions of the secondary memory, such as but not limited to supporting picture-in-picture operations. The content streams may be outputted to any number of media devices, both local to and remote from the secondary memory.

Block 42 relates to continuously determining the occurrence of at least one buffering event, i.e., event associated with use of the secondary memory 12, for the content streams currently being buffered with the secondary memory 12. If the buffering event is active or a new buffering event replaced the previous event, Block 40 may be returned to continue outputting the content stream to the media output device. If buffering event ceases and a non-buffering event has occurred, i.e., a DVR related event, Block 44 is reached.

Block 44 relates to activating one or more of the deactivated aspects of the primary memory 14 associated with the content stream that is no longer experiencing a buffering event. This may include activating the corresponding disc, write element, and read element and/or some combination thereof, such as but not limited to activating only the read element if the corresponding disc and write element were already activated, which may occur during recording and simultaneous live watching of the content stream.

Block 46 relates to partitioning additional memory to compensate for delays associated with activating the previously deactivated aspect of the primary memory 14. The secondary memory 12 may include a relationship between allocated memory and an amount of time for which the content may be buffered due to the in/out nature of the memory such that additional memory may be allocated to cover the time it takes to ready the primary memory to begin storing the buffered content. Optionally, compression or other techniques may be used to prolong secondary memory storage in order to compensate for the activation delays of the primary memory 14.

Block 48 relates to diverting the content stream associated with Block 46 to the primary memory 14 in order to support more permanent storage, such as but not limited to supporting instigation of DVR related event. This may include outputting the content stored on the secondary memory 12 to the media output device and simultaneously diverting the incoming (new portions) of the content stream to the primary memory, wherefrom the primary memory may be used to output the content stream to the media output device in Block 50.

Block 52 relates to determining occurrence of a buffering event for the content being diverted to the primary memory. This analysis to be performed similarly to the analysis described above with respect to determining the buffering event. If a buffering event is not determined, Block 50 is returned to and the primary memory continues to output the content to the media output device. If a buffering event is determined, the content stream may be immediately diverted to the secondary memory 12. Because the secondary memory 12 does not necessarily include the same moving elements as the primary memory 14, the diversion can occur immediately by simply partitioning the secondary memory 12 to support the storage so as to avoid the delays associated with activating the inactive primary memory.

As described above, one non-limiting aspect of the present invention relates to limiting hard drive operations in DVRs or similar devices. One non-limiting aspect of the present invention relates to buffering content streams with a non-hard drive memory (secondary memory) and only routing content streams to the hard drive when DVR events are requested.

DVR hard drives are constantly recording content streams during television viewing in expectation of a DVR event, such as but not limited to rewind, pause, record, or similar DVR event requiring extended hard drive recording. Typically, the hard drive continuously buffers a minimal amount of content in expectation of the DVR event such that the hard drive is continuously recording. The continuous buffering of the hard drive can degrade its performance over time, as one skilled in the art will appreciate. One non-limiting aspect of the present invention proposes to ameliorate the constant recording with a secondary memory.

The secondary memory may be a static memory or other memory having capabilities sufficient to buffer the couple of seconds of content continuously buffered with the hard drive, including additional time associated with activating the hard drive. The content may be buffered through the secondary memory instead of the hard drive in order to free the hard drive from the continuous buffering. If a DVR event requiring long term recording occurs, the content stream may be diverted from the secondary memory to the hard drive. This allows the present invention to support all DVR events without requiring continuous hard drive operations.

Another non-limiting aspect of the present invention relates to dual-tuner DVRs and alleviating hard drive processing for multi-head hard drives. This would generally relate to buffering the content through multiple secondary memories and diverting therefrom as needed to support DVR events. This may lead to a multiple function environment when content is buffered to the secondary memory while other content is also written to the hard drive.

As required, detailed embodiments of the present invention are disclosed herein; however, it is to be understood that the disclosed embodiments are merely exemplary of the invention that may be embodied in various and alternative forms. The figures are not necessarily to scale, some features may be exaggerated or minimized to show details of particular components. Therefore, specific structural and functional details disclosed herein are not to be interpreted as limiting, but merely as a representative basis for the claims and/or as a representative basis for teaching one skilled in the art to variously employ the present invention.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

The invention claimed is:

1. A method comprising:
receiving, by a computing device comprising a mechanical memory and a non-mechanical memory, a request associated with a media content item;
determining to record the media content item via the mechanical memory instead of the non-mechanical memory;
activating a portion of the mechanical memory to record the media content item;
temporarily recording a portion of the media content item via the non-mechanical memory based on a delay associated with the activation of the portion of the mechanical memory;
diverting the media content item from the mechanical memory to the non-mechanical memory;
deactivating the portion of the mechanical memory corresponding to the media content item;
causing output of the media content item via the non-mechanical memory;
receiving, by the computing device, a second request associated with a second media content item;
determining to record the second media content item via the mechanical memory instead of the non-mechanical memory;
reactivating the deactivated portion of the mechanical memory to record the second media content item; and
temporarily recording a portion of the second media content item via the non-mechanical memory based on a delay associated with the reactivation of the portion of the mechanical memory.

2. The method of claim 1, further comprising causing recording of the media content item via the mechanical memory during output, by a display device, of the media content item.

3. The method of claim 1, wherein the portion of the mechanical memory comprises a read head of the mechanical memory.

4. The method of claim 1, wherein the determining is based on whether the request is associated with long term access to the media content item.

5. The method of claim 1, further comprising:
assigning a first partition, of the non-mechanical memory, for recording content from a first content stream;
assigning a second partition, of the non-mechanical memory, for recording content from a second content stream, wherein the causing recording comprises causing, based on a determination of whether the media content item is from the first content stream or the second content stream, recording of the media content item via one of the first partition or the second partition of the non-mechanical memory.

6. The method of claim 1, wherein the non-mechanical memory stores information indicating a relationship between a partition of the non-mechanical memory and the delay associated with the activation of the portion of the mechanical memory, further comprising:
assigning the partition of the non-mechanical memory based on the stored information.

7. The method of claim 6, wherein the temporarily recording comprises:

temporarily recording the portion of the media content item via the partition of the non-mechanical memory.

8. A system comprising:
input/output circuitry configured to:
receive, by a computing device comprising a mechanical memory and a non-mechanical memory, a request associated with a media content item;
control circuitry configured to:
determine to record the media content item via the mechanical memory instead of the non-mechanical memory;
activate a portion of the mechanical memory to record the media content item;
temporarily record a portion of the media content item via the non-mechanical memory based on a delay associated with the activation of the portion of the mechanical memory;
divert the media content item from the mechanical memory to the non-mechanical memory;
deactivate the portion of the mechanical memory corresponding to the media content item;
cause output of the media content item via the non-mechanical memory;
receive, by the computing device, a second request associated with a second media content item;
determine to record the second media content item via the mechanical memory instead of the non-mechanical memory;
reactivate the deactivated portion of the mechanical memory to record the second media content item; and
temporarily record a portion of the second media content item via the non-mechanical memory based on a delay associated with the reactivation of the portion of the mechanical memory.

9. The system of claim 8, wherein the control circuitry is further configured to cause recording of the media content item via the mechanical memory during output, by a display device, of the media content item.

10. The system of claim 8, wherein the input/output circuitry further comprises a portion of the mechanical memory comprised of a read head.

11. The system of claim 8, wherein the control circuitry is further configured to complete the determining based on whether the request is associated with long term access to the media content item.

12. The system of claim 8, wherein the control circuitry is further configured to:
assign a first partition, of the non-mechanical memory, for recording content from a first content stream;
assign a second partition, of the non-mechanical memory, for recording content from a second content stream, wherein the causing recording comprises causing, based on a determination of whether the media content item is from the first content stream or the second content stream, recording of the media content item via one of the first partition or the second partition of the non-mechanical memory.

13. The system of claim 8, wherein the input/output circuitry is further configured such that the non-mechanical memory stores information indicating a relationship between a partition of the non-mechanical memory and the delay associated with the activation of the portion of the mechanical memory, and the control circuitry is further configured to:
assign the partition of the non-mechanical memory based on the stored information.

14. The system of claim 8, wherein the control circuitry is further configured to execute the temporarily recording by:
temporarily recording the portion of the media content item via the partition of the non-mechanical memory.

15. A non-transitory computer readable medium which comprises instructions that, when executed by control circuitry, enable a system to:
receive, by a computing device comprising a mechanical memory and a non-mechanical memory, a request associated with a media content item;
determine to record the media content item via the mechanical memory instead of the non-mechanical memory;
activate a portion of the mechanical memory to record the media content item;
temporarily record a portion of the media content item via the non-mechanical memory based on a delay associated with the activation of the portion of the mechanical memory;
divert the media content item from the mechanical memory to the non-mechanical memory;
deactivate the portion of the mechanical memory corresponding to the media content item;
cause output of the media content item via the non-mechanical memory;
receive, by the computing device, a second request associated with a second media content item;
determine to record the second media content item via the mechanical memory instead of the non-mechanical memory;
reactivate the deactivated portion of the mechanical memory to record the second media content item; and
temporarily record a portion of the second media content item via the non-mechanical memory based on a delay associated with the reactivation of the portion of the mechanical memory.

16. The non-transitory computer readable medium of claim 15, further configured to cause recording of the media content item via the mechanical memory during output, by a display device, of the media content item.

17. The non-transitory computer readable medium of claim 15, further configured to enable control circuitry to use a portion of the mechanical memory comprised of a read head.

18. The non-transitory computer readable medium of claim 15, further configured to complete the determining based on whether the request is associated with long term access to the media content item.

19. The non-transitory computer readable medium of claim 15, further configured to:
assign a first partition, of the non-mechanical memory, for recording content from a first content stream;
assign a second partition, of the non-mechanical memory, for recording content from a second content stream, wherein the causing recording comprises causing, based on a determination of whether the media content item is from the first content stream or the second content stream, recording of the media content item via one of the first partition or the second partition of the non-mechanical memory.

20. The non-transitory computer readable medium of claim 15, further configured such that the non-mechanical memory stores information indicating a relationship between a partition of the non-mechanical memory and the delay associated with the activation of the portion of the mechanical memory, and the control circuitry is further configured to:

assign the partition of the non-mechanical memory based on the stored information.

21. The non-transitory computer readable medium of claim 15, further configured to execute the temporarily recording by:

temporarily recording the portion of the media content item via the partition of the non-mechanical memory.

* * * * *